(12) United States Patent
Maloney et al.

(10) Patent No.: US 7,895,928 B2
(45) Date of Patent: Mar. 1, 2011

(54) SHEAR DEVICE

(75) Inventors: Michael Maloney, Clinton, MI (US); Donald Nash, Wyandotte, MI (US)

(73) Assignee: Flat Rock Metal Inc., Flat Rock, MI (US)

( * ) Notice: Subject to any disclaimer, the term of this patent is extended or adjusted under 35 U.S.C. 154(b) by 336 days.

(21) Appl. No.: 12/060,465

(22) Filed: Apr. 1, 2008

(65) Prior Publication Data
US 2009/0090227 A1  Apr. 9, 2009

Related U.S. Application Data

(60) Provisional application No. 60/977,573, filed on Oct. 4, 2007.

(51) Int. Cl.
B26D 7/06 (2006.01)

(52) U.S. Cl. ............... 83/112; 83/240; 83/196; 83/424

(58) Field of Classification Search ............ 83/196, 83/202, 240, 246, 248, 111, 112, 155, 271, 83/734, 401, 412, 415, 435.11, 435.12, 435.13, 83/670, 215, 694, 424; 198/341.01, 586, 198/588, 594, 812, 817, 861.5
See application file for complete search history.

(56) References Cited

U.S. PATENT DOCUMENTS

| | | | | |
|---|---|---|---|---|
| 1,339,816 A * | 5/1920 | Fiddyment | | 29/29 |
| 2,141,574 A * | 12/1938 | Wamser | | 83/341 |
| 2,319,099 A * | 5/1943 | Abramson et al. | | 425/304 |
| 2,962,083 A * | 11/1960 | Hasselquist | | 156/512 |
| 3,122,042 A * | 2/1964 | Littell et al. | | 83/215 |
| 3,440,910 A * | 4/1969 | Scribner | | 83/94 |
| 4,327,618 A * | 5/1982 | Menard | | 83/468 |
| 4,606,250 A * | 8/1986 | Krosbacher et al. | | 83/161 |
| 4,739,683 A * | 4/1988 | Ogawa | | 83/320 |
| 5,456,656 A * | 10/1995 | Skovira | | 601/84 |
| 6,227,090 B1 * | 5/2001 | Genseberger | | 83/240 |
| 6,605,099 B1 * | 8/2003 | Hellenkamp | | 606/166 |
| 6,637,586 B1 * | 10/2003 | Kuecker et al. | | 198/774.2 |
| 7,048,828 B2 * | 5/2006 | Wiedow et al. | | 162/280 |
| 7,490,712 B2 * | 2/2009 | Hamers et al. | | 198/588 |
| 2003/0159906 A1 * | 8/2003 | Rinks et al. | | 198/586 |
| 2005/0109477 A1 * | 5/2005 | Wiedow et al. | | 162/280 |
| 2006/0254621 A1 | 11/2006 | Carhuff et al. | | |

OTHER PUBLICATIONS

Canadian Office Action dated Dec. 1, 2010 for Application 2,638,328.

* cited by examiner

Primary Examiner — Kenneth E. Peterson
Assistant Examiner — Sean Michalski
(74) Attorney, Agent, or Firm — Honigman Miller Schwartz and Cohn LLP

(57) ABSTRACT

A shear device is disclosed. The shear device includes a material guiding mechanism, a shear head including a shear blade disposed proximate the material guiding mechanism, and a linkage for translating a first movement of one of the shear head and the material guiding mechanism into a second movement of the other of the shear head and the material guiding mechanism. A method is also disclosed.

6 Claims, 15 Drawing Sheets

SHEAR DEVICE

RELATED APPLICATION

This disclosure claims the benefit of Provisional Patent Application No. 60/977,573 filed on Oct. 4, 2007.

TECHNICAL FIELD

This invention relates to a shear device and more particularly relates to a shear device that is adjustable so as to shear a workpiece into any desirable configuration.

BACKGROUND

Metal shears are well known devices for cutting sheet metal. Metal shears can range anywhere from small hand held devices to large fixed platforms weighing several tons. Metal shears may have a fixed cutting head (wherein the position of the cutting head is fixed relative to the infeed of material). Metal shears are also available with pivoting heads wherein the angle of the shear cutting head can be adjusted relative to the infeed of the material. Although pivoting shears are well known in the art, they suffer from a number of drawbacks. For example, although pivoting shears offer the flexibility of varying the angle of the shear cut, the fact that the shear head is movable makes it more difficult to hold certain dimensional tolerances on the sheet metal being processed by the shear. Additionally, pivoting the shear head introduces certain complications to the design of the mechanisms used to deliver the sheet material to the shear and the mechanisms used to remove the sheet material from shear (after the material has been sheared). Moreover, shears that are used in an automatic setting (where the sheet material is automatically fed to the shear and removed from the shear) must be able to position the sheet metal very accurately in order to achieve consistency amongst the sheet metal blanks produced by the shear.

BRIEF DESCRIPTION OF THE DRAWINGS

The disclosure will now be described, by way of example, with reference to the accompanying drawings, in which.

DETAILED DESCRIPTION

The Figures illustrate an exemplary embodiment of a shear device in accordance with an embodiment of the invention. Based on the foregoing, it is to be generally understood that the nomenclature used herein is simply for convenience and the terms used to describe the invention should be given the broadest meaning by one of ordinary skill in the art.

Figure 1:
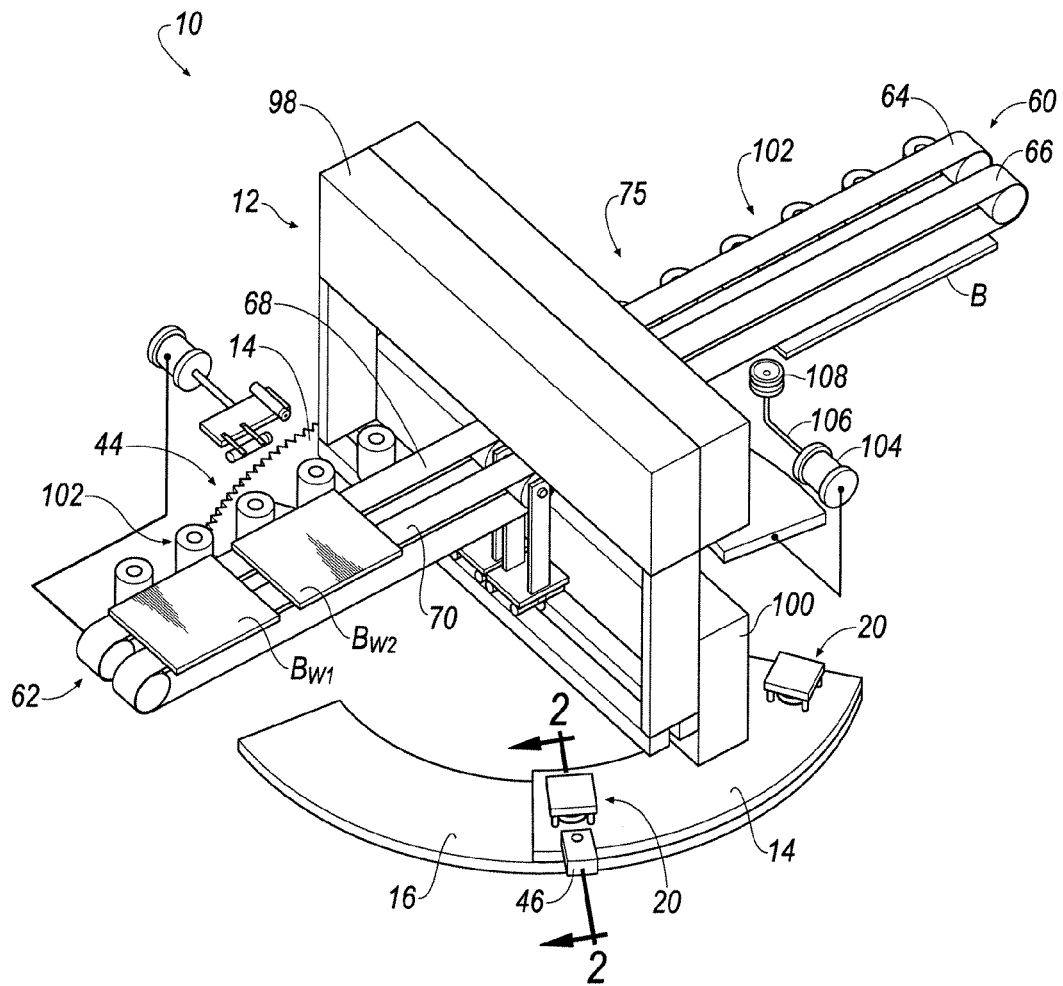
FIG. 1 is an isometric view of a shear device in accordance with an exemplary embodiment of the invention.
Figure 2A:
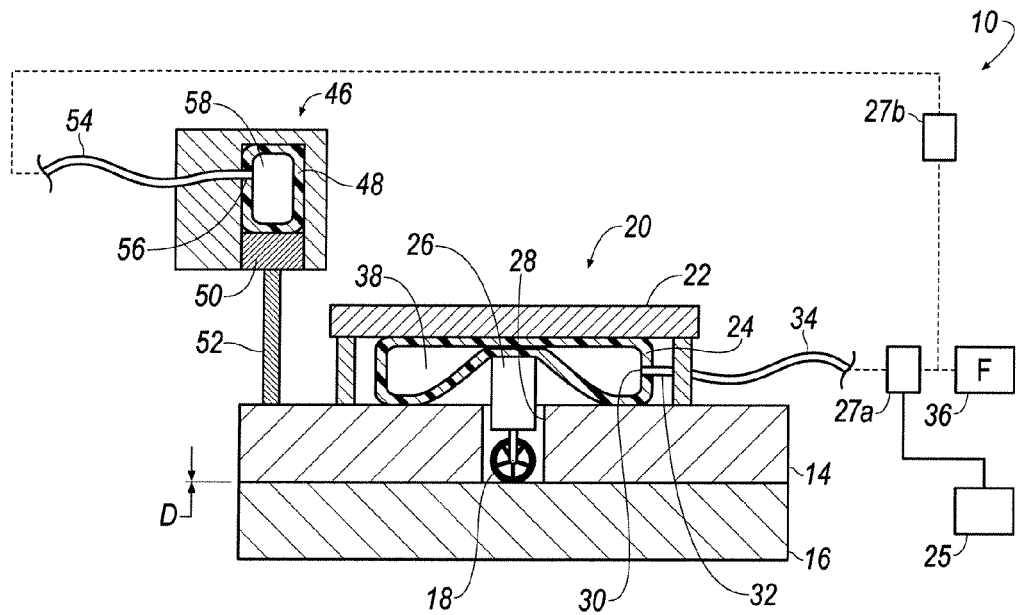
FIG. 2A is a partial cross-sectional view of the shear device according to line 2-2 of FIG. 1 wherein the inflatable bladder is deflated.
Figure 2B:
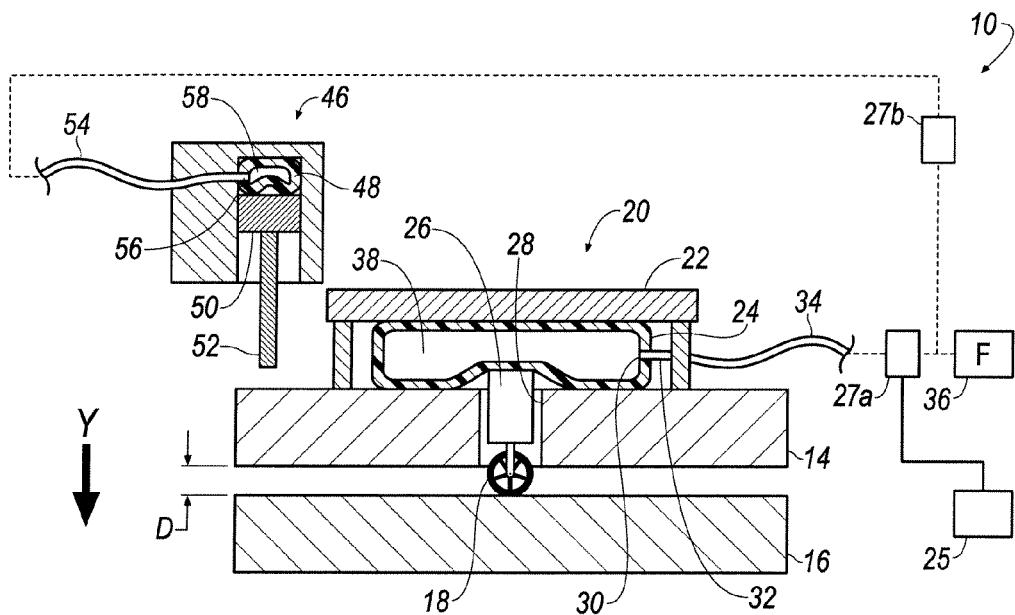
FIG. 2B is a partial cross-sectional view of the shear device according to line 2-2 of FIG. 1 wherein the inflatable bladder is inflated.

Referring now to FIGS. 1-2B, a shear device is shown generally at 10 and includes a shear head, which is shown generally at 12. The shear head 12 is supported on a carriage 14. The carriage 14 is supported by and movable relative to a track 16. As illustrated, the carriage 14 and track 16 may be both defined, in part, by an arcuate surface; however, it will be appreciated that the carriage 14 and track 16 are not limited to an arcuate shape and may include any desirable shape or corresponding structure.

The carriage 14 is capable of moving relative the track 16 using any number of mechanisms, such as, for example, wheels 18 (see, e.g., FIG. 2A, 2B), low friction surfaces, fluid pressure, air pressure, or the like. In an embodiment, the shear device 10 includes four wheel assemblies 20. Each wheel assembly 20 may include at least one wheel 18. As illustrated, each wheel assembly 20 is arranged proximate each end of the arcuate carriage 14 although it will be appreciated that each wheel assembly 20 may be positioned at any desirable location.

Referring to FIGS. 2A and 2B, in an embodiment, the wheel assemblies 20 include a housing 22 that supports and/or encloses an inflatable bladder 24. Each inflatable bladder 24 is connected to or disposed adjacent a piston 26. The piston 26 is connected to the wheel 18. As illustrated, the piston 26 and wheel 18 are partially disposed in an opening 28 formed in the carriage 14.

As seen in FIGS. 2A and 2B, the inflatable bladder 24 includes an opening 30 that receives an end 32 of a conduit 34 to permit fluid communication with the bladder 24. A second end (not shown) of the conduit 34 is connected to a source 36 of pressurized fluid, F.

Initially, the inflatable bladder 24 may be in a retracted (or deflated) state (see, e.g., FIG. 2A). In the retracted, deflated state, the carriage 14 is located substantially adjacent the track 16 such that the carriage 14 and track 16 are spaced from each other at a distance, D, approximately equal to 0-meters.

When it is determined that the inflatable bladder 24 should be expanded, a controller 25 may cause a device 27a including, for example, a pump and/or a valve to permit the pressurized fluid, F, to be delivered to an interior cavity 38 of the bladder 24 by way of the fluid conduit 34. Thus, the inflatable bladder 24 may be expanded from the retracted, deflated state (see, e.g., FIG. 2A) to an expanded, inflated state (see, e.g., FIG. 2B).

When expanded to the inflated state, the inflatable bladder 24 exerts a force in the direction of arrow, Y, and pushes downwardly on the piston 26, which, in turn, pushes downwardly on the wheel 18. When sufficient force is generated by the inflatable bladder 24 in the direction of arrow, Y, the carriage 14 is moved away from the track 16, thereby increasing the distance, D, between the carriage 14 and the track 16. In an embodiment, when the inflatable bladder 24 is inflated, the distance, D, may fall in the range of 0.1-0.5 inches.

Figure 3:
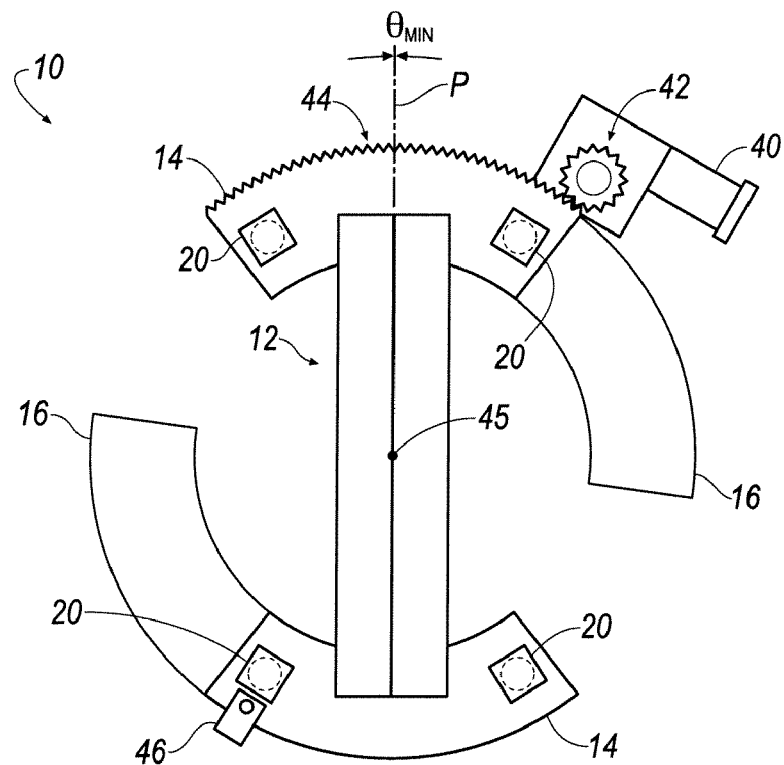
FIG. 3 is a partial top view of the shear device of FIG. 1 in a first position according to an embodiment.
Figure 4:
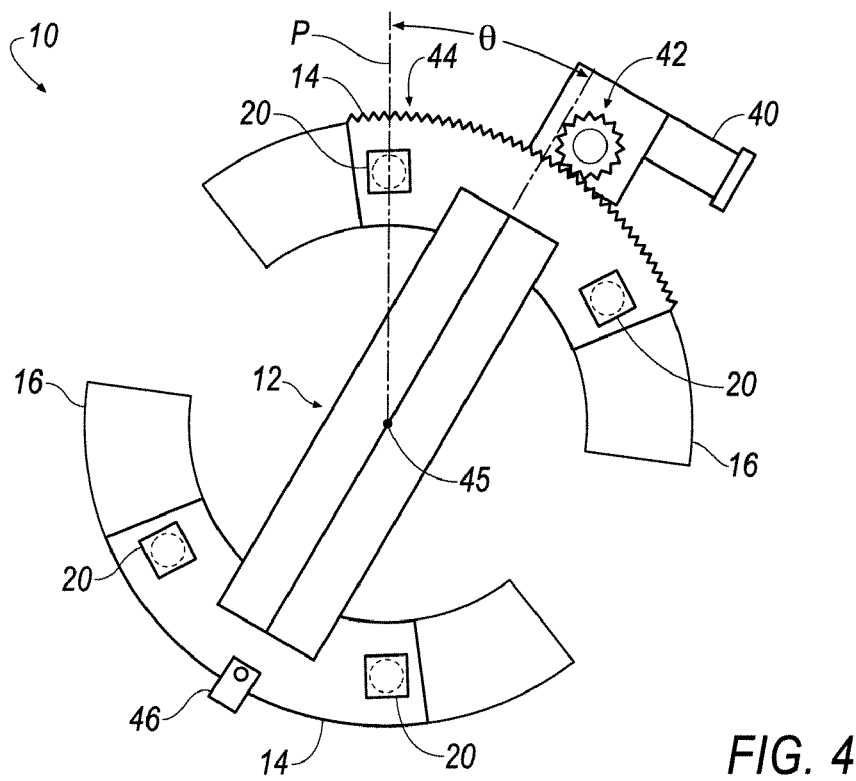
FIG. 4 is a partial top view of the shear device of FIG. 3 in another position according to an embodiment.
Figure 5:
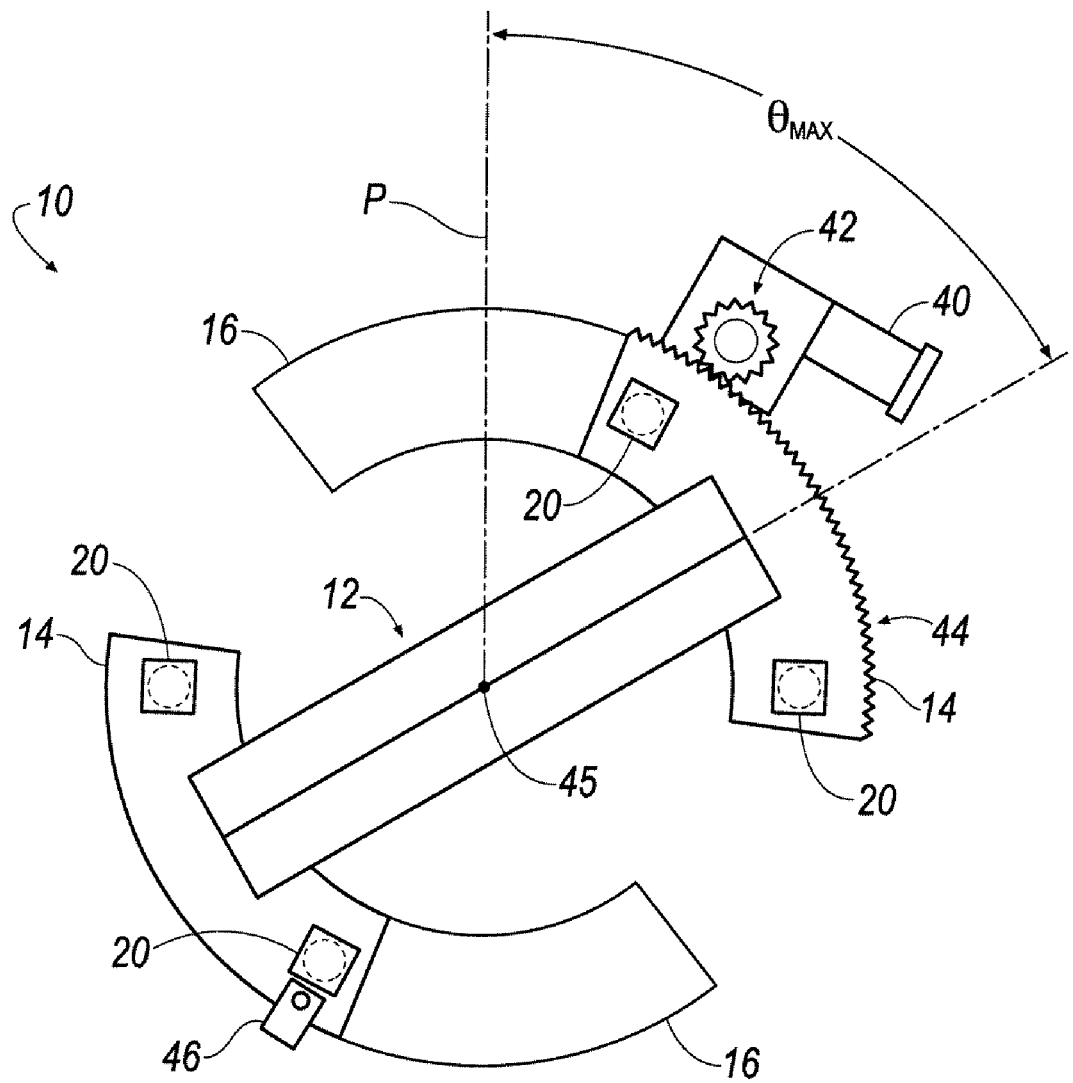
FIG. 5 is a partial top view of the shear device of FIG. 4 in another position according to an embodiment.

Referring to FIGS. 3-5, once a sufficient distance, D, greater than, for example, 0-meters, has been provided between the carriage 14 and the track 16, a motor 40 and a worm drive gear 42 can be activated to rotatingly engage an arcuate geared surface 44 that is formed by or attached to the carriage 14. As illustrated, the arcuate geared surface 44 is provided on an outer circumferential edge of the arcuate carriage 14. When the worm drive gear 42 is rotated by the motor 40, the reaction force generated between the worm drive gear 42 and the arcuate geared surface 44 acts to rotate the carriage 14, which, in turn, rotates the shear device 10 about an axis extending through a pivot point, which is shown generally at 45.

Because the shear head 12 is supported by the carriage 14, any rotational movement of the carriage 14 relative the track 16 is imparted to the shear head 12. The rotational movement of the shear head 12 is shown to be defined by an angular position, θ (see, e.g., FIG. 4), that is bound by a first, minimum angular position, $\theta_{MIN}$ (see, e.g., FIG. 3), that is approximately equal to 0° and a second, maximum angular position, $\theta_{MAX}$ (see, e.g., FIG. 5), that is approximately equal to, for example, 60°. It will be appreciated that the second, maximum angular position, $\theta_{MAX}$, may be increased or decreased as desired by increasing or decreasing the length or partial circumference of the gear surface 44. As seen in FIG. 3, the first, minimum angular position, $\theta_{MIN}$, is referenced from a starting position of the shear head 12 according to line, P. When referenced from a top view of the shear device 10, the line, P, is located substantially perpendicular to a material guiding mechanism 75, which is described in greater detail in the foregoing disclosure.

Referring to FIGS. 2A-5, an optional a brake/clamp assembly 46 may be used to urge the carriage 14 and the track 16 against one another when the inflatable lift bladder 24 is in the retracted, deflated state of FIG. 2A. By using a brake/clamp assembly 46 to urge the carriage 14 against the track 16 when the inflatable lift bladder 24 is not pressurized, any movement of the carriage 14 relative the track 16, which may be otherwise induced by way of machinery vibration and the like, is eliminated.

It will be appreciated that the brake/clamp assembly 46 can utilize any number of technologies to prevent relative movement of the carriage 14 and the track 16. Referring to FIGS. 2A and 2B, in an embodiment, one possible way of implementing brake/clamp assembly 46 is to locate the brake/clamp assembly 46 above the carriage 14 and track 16 such that the brake/clamp assembly 46 exerts a force in the direction of the arrow, Y, adjacent the carriage 14 such that the force applied to the carriage 14 results in the carriage being pressed against the track 16.

In an embodiment, the brake/clamp 46 may include an inflatable bladder 48 that may be urged against a brake piston 50 that is connected to a brake engagement mechanism 52. In an embodiment, the brake inflatable bladder 48 may be attached to a fluid conduit 54 at an opening 56 formed in the brake inflatable bladder 46. The conduit 54 permits pressurized fluid, F, to be delivered to an interior cavity 58 of the brake inflatable bladder 48 from the source 36 containing the pressurized fluid, F. Flow of the pressurized fluid, F, to/from the interior cavity 58 is controlled by the controller 25 and a device 27b, as similarly described above with respect to the controller 25 and device 27a.

Initially, as shown in FIG. 2A, the brake bladder 48 may be expanded in an inflated state thereby exerting downward force in the direction of the arrow, Y, on brake piston 50, which, in turn, forces the brake engagement mechanism 52 against the carriage 14. At a later time as shown in FIG. 2B, when the controller 25, for example, actuates the device 27b, the pressurized fluid, F, is evacuated from the interior cavity 58 by way of the conduit 54; in this instance, the inflatable brake bladder 48 retracts to a deflated state thereby retracting brake piston 50 away from the carriage 14. As a result of the retraction of the brake piston 50, the brake engagement mechanism 52 is withdrawn and moved away from the carriage 14. When brake clamp assembly 46 is withdrawn (as shown in FIG. 2B), the inflatable lift bladder 24 can then be activated to elevate carriage 14 away from track 16 as described above. Brake clamp assembly may be anchored to track 16.

In an embodiment, the controller 25 may be a programmable logic controller (PLC). Further, the controller 25 may also be connected to the motor 40 in order to drive the worm gear 42. Alternatively, if desired, the motor 40, bladders 24, 48, and the brake/clamp assembly 46 can all be controlled by way of individual operator controls (not shown).

Figure 12:
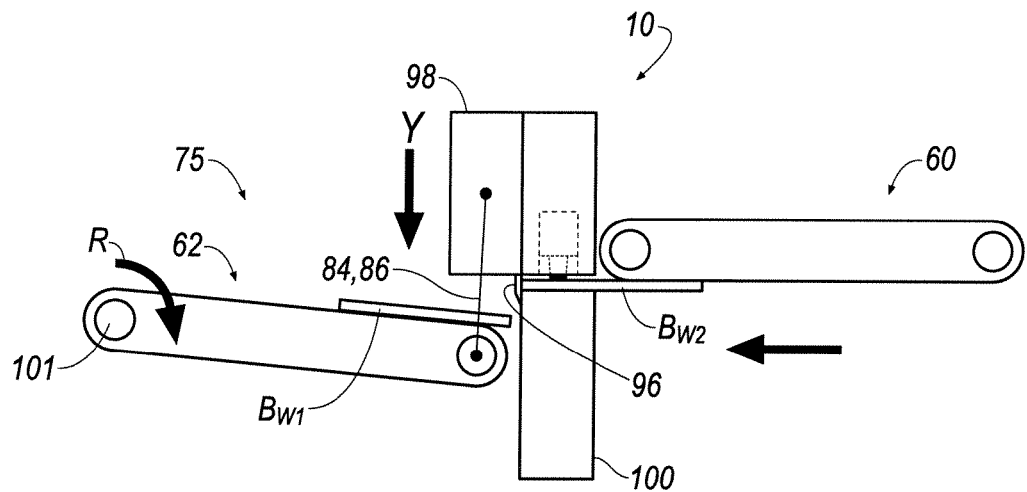
FIG. 12 is a partial side view of the pair of datum tracks coupled to the shear head of FIG. 11 in another position according to an embodiment.
Figure 13:
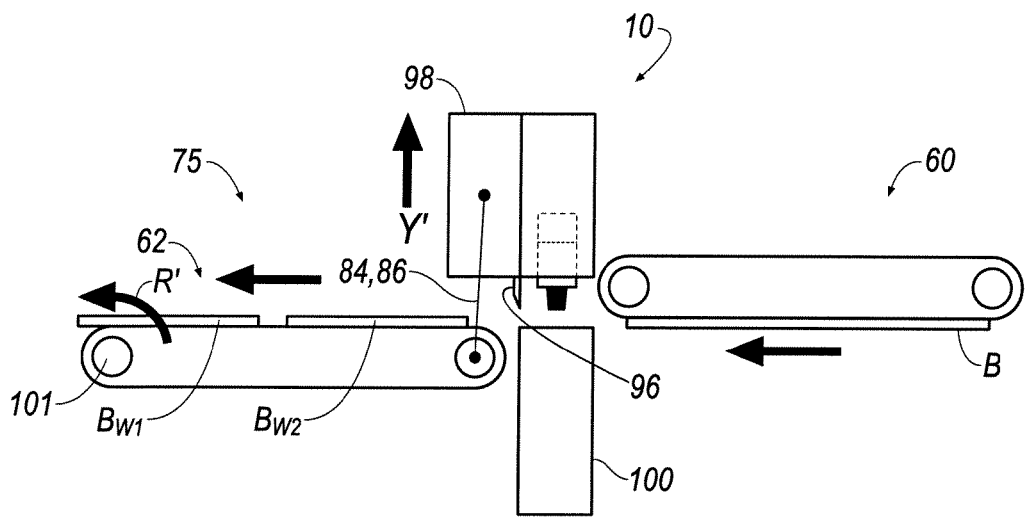
FIG. 13 is a partial side view of the pair of datum tracks coupled to the shear head of FIG. 12 in another position according to an embodiment.

As explained above in conjunction with FIGS. 1-5, the shear head 12 is rotatable about a fixed pivot point 45 by moving the carriage 14 relative the fixed track 16. In operation, the shear head 12 may be pivoted about the fixed pivot point 45 to selectively divide a blank of material, B (see, e.g., FIGS. 10-18), into two or more to work-pieces, $B_{W1}$, $B_{W2}$ (see, e.g., FIGS. 12-13 and 18), having a desired shape/configuration.

Figure 6:
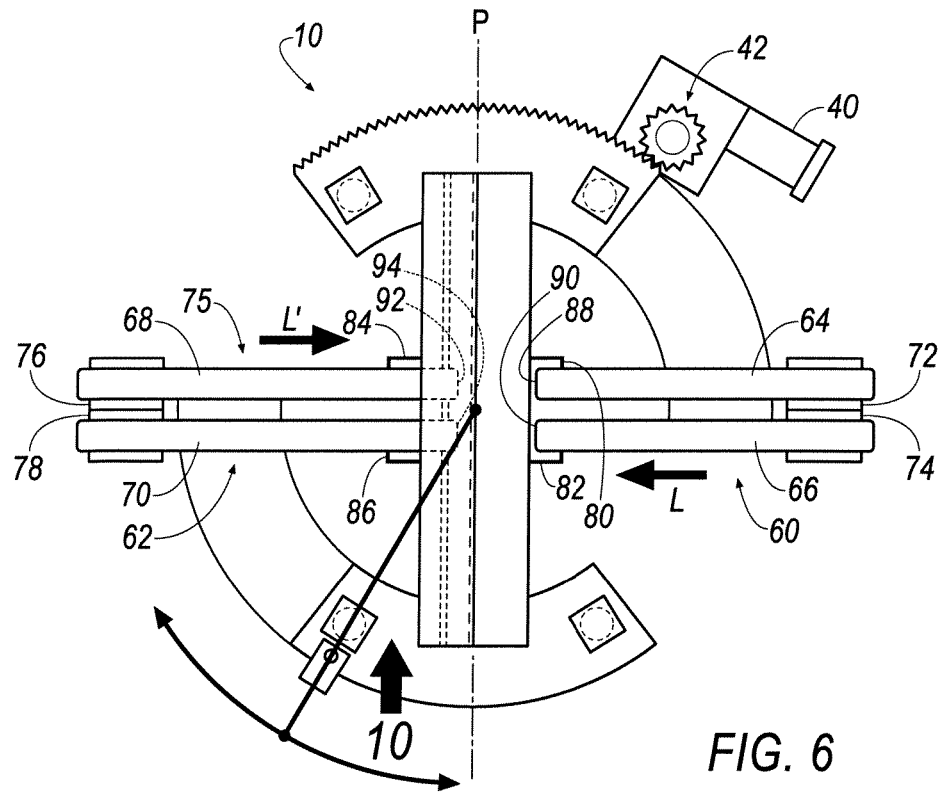
FIG. 6 is a partial top view of the shear device of FIG. 1 in a first position according to an embodiment.
Figure 7:
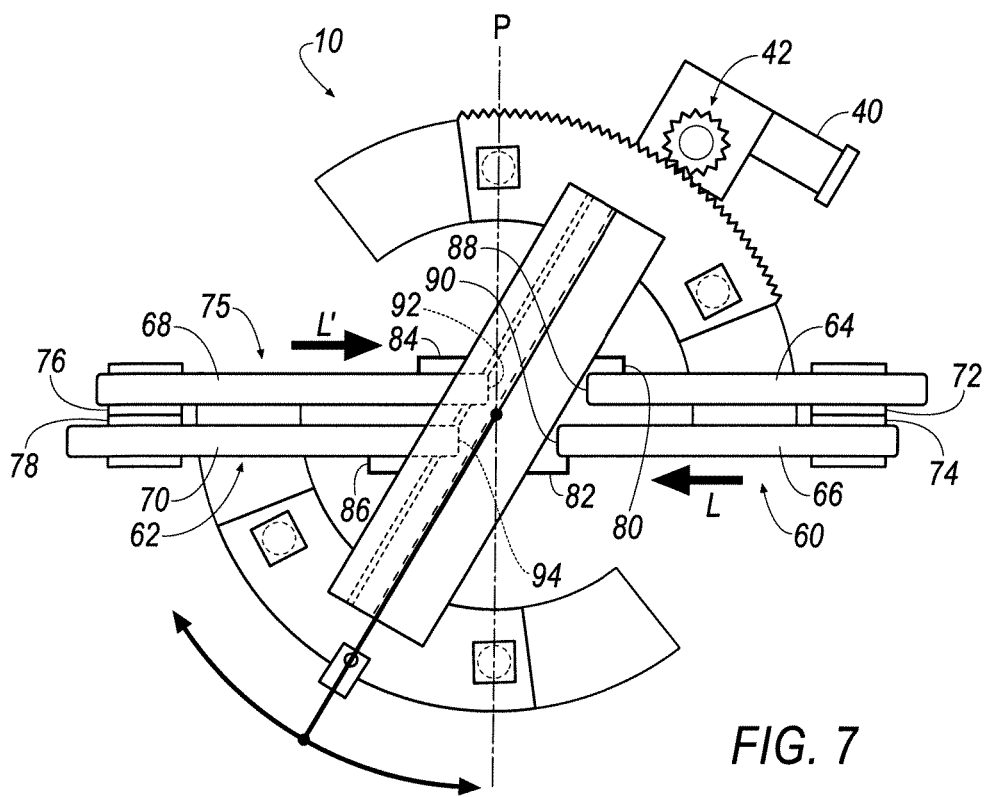
FIG. 7 is a partial top view of the shear device of FIG. 6 in another position according to an embodiment.
Figure 8:
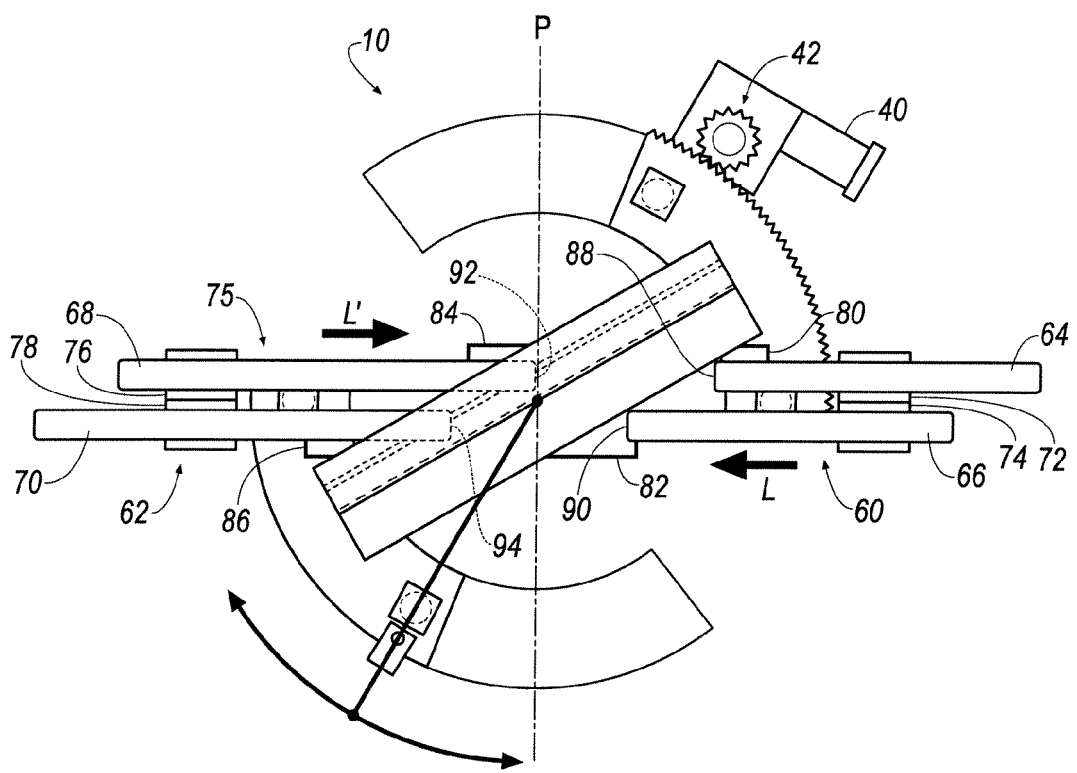
FIG. 8 is a partial top view of the shear device of FIG. 7 in another position according to an embodiment.

Referring to FIGS. 6-8, the blank of material, B, is guided proximate the shear head 12 by way of a material guiding mechanism 75. The material guiding mechanism 75 generally includes a delivery portion 60 and a removing portion 62.

In general, the delivery portion 60 delivers the blank of material, B, proximate the shear head 12. Prior to, or, at the time the blank of material, B, is delivered proximate the shear head 12, the shear head 12 is oriented to the desired angle, $\theta_{MIN}$-$\theta_{MAX}$, as described above. Then, the shear head 12 is actuated, which is described in the foregoing disclosure, to shear the blank of material, B, into the two or more to work-pieces, $B_{W1}$, $B_{W2}$. Then, upon shearing the blank of material, B, into the two or more to work-pieces, $B_{W1}$, $B_{W2}$, the two or more work-pieces, $B_{W1}$, $B_{W2}$, are removed from shear head 12 by way of the removing portion 62.

It will be appreciated that any number of delivery and removing portions 60, 62 can be used for guiding the blank and work pieces, B, $B_{W1}$, $B_{W2}$, to/from the shear head 12. In an embodiment, the material delivery/removing portions 60, 62 may include, for example, traditional conveyor systems, magnetic delivery systems and the like to support the material B, $B_{W1}$, $B_{W2}$, on either an upper or lower surface of the delivery/removing portions 60, 62.

In an embodiment, each delivery portion 60 and removing portion 62 is composed of respectively associated first and second laterally movable datum tracks 64, 66 and 68, 70. Each track 64-70 is supported by at least one respectively-associated support, which is shown generally at 72, 74, 76, and 78. The supports 72-78 may allow their respectively-associated track 64-70 to freely move in a lateral direction, which is shown generally at L, L', that is substantially perpendicular to the line, P. It will be appreciated that the first lateral direction, L, is substantially opposite the second lateral direction, L'.

Figure 9A:
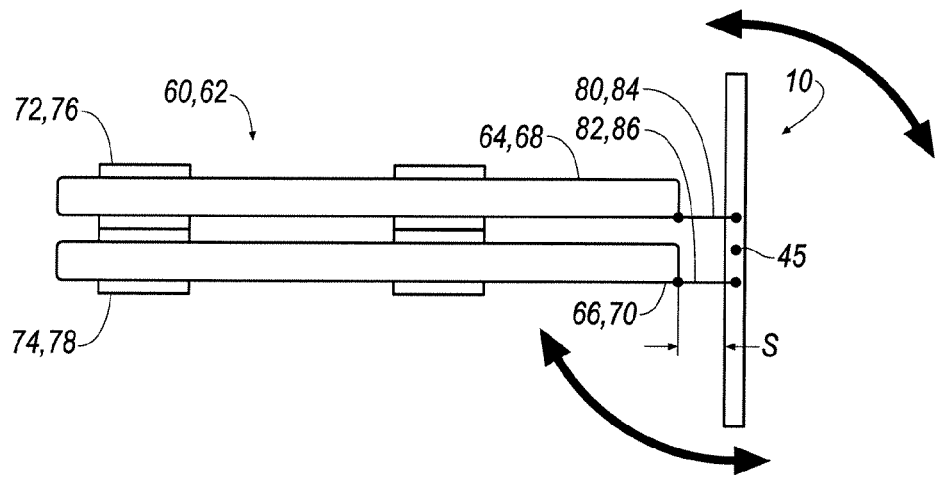
FIG. 9A is a top view of a pair of datum tracks coupled to the shear head of the shear device of FIG. 1 in a first position according to an embodiment.
Figure 9B:
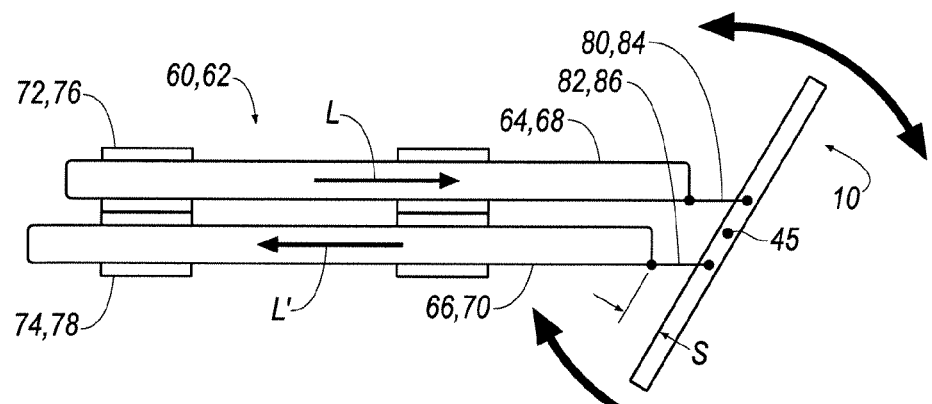
FIG. 9B is a top view of the pair of datum tracks coupled to the shear head of FIG. 9A in another position according to an embodiment.
Figure 9C:
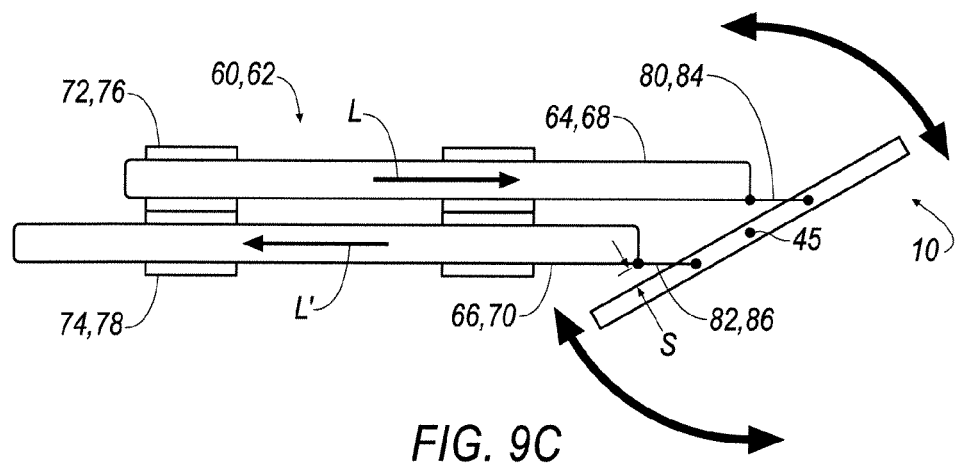
FIG. 9C is a top view of the pair of datum tracks coupled to the shear head of FIG. 9B in another position according to an embodiment.
Figure 10:
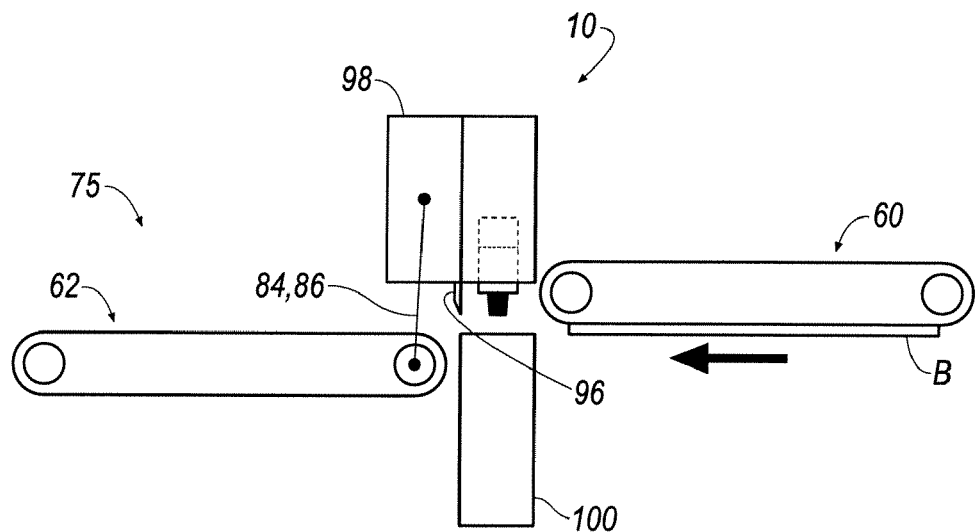
FIG. 10 is a partial side view of the pair of datum tracks coupled to the shear head of the shear device of FIG. 1 in a first position according to an embodiment.
Figure 11:
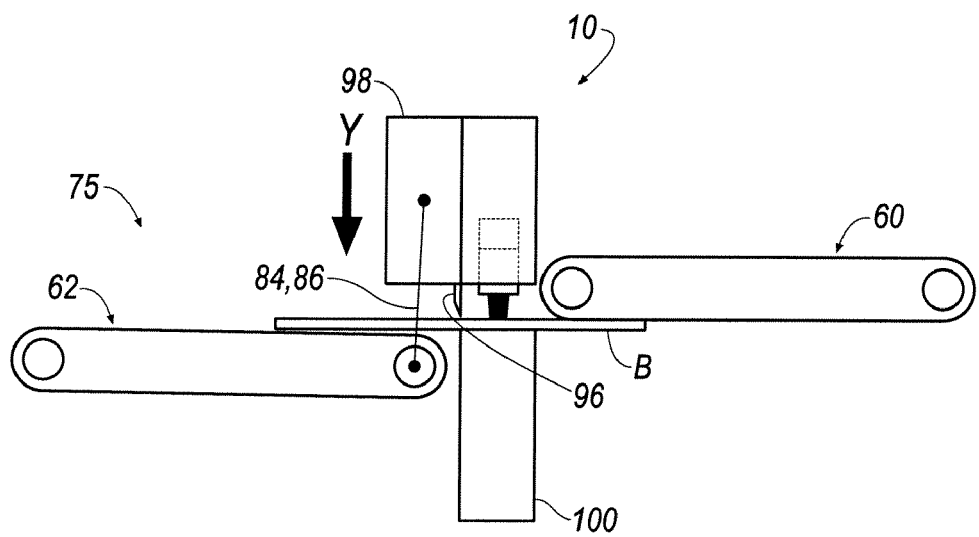
FIG. 11 is a partial side view of the pair of datum tracks coupled to the shear head of FIG. 10 in another position according to an embodiment.

Referring now to FIGS. 9A-9C, the left side, or, removing portion 62 of the guiding mechanism 75 is shown according to an embodiment. However, in the foregoing functional description, it will be appreciated that the lateral movement, L, L', of the datum tracks 68, 70 of the removing portion 62 is also similar for the datum tracks 64, 66 of the delivering portion 60. Accordingly, reference numerals for both sides/portions 60, 62 of the guiding mechanism 75 are represented in FIGS. 9A-9C.

First, as shown in FIG. 9A, the datum tracks 64, 68 and 66, 70 are not laterally displaced relative one another due to the fact that the shear head 12 has not been deviated from its minimum angular positioning, $\theta_{MIN}$. As shown in FIGS. 9B and 9C, when the shear head 12 deviates from its minimum angular positioning, $\theta_{MIN}$, the first and second datum tracks 64, 68 and 66, 70 of the delivery and removing portions 60, 62 are laterally displaced relative one another. For example, as seen in FIGS. 9B-9C, as the first datum track 64, 68 moves in the direction of arrow, L, the second datum track 66, 70 moves in the opposite direction according to the direction of the arrow, L'. Further, it will be appreciated in the foregoing description that the directional movement of the first datum tracks 64, 68 and the second datum tracks 66, 70 of the delivery portion 60 and the removing portion 62 are synchronized with one another.

As seen in FIGS. 6-9C, to provide the synchronized movement of the datum tracks 64-70 described above, each datum track 64-70 is connected to the shear head 12 by way of a respectively associated link member 80, 82, 84, and 86. Accordingly, as the shear head 12 rotates about the pivot point 45, the link members 80-86 push/pull their respective track 64-70 in the direction according to arrows L, L' described above.

The lateral movement L/L' of the datum track members 64-70 described above can be seen in a progressive manner from FIG. 6 to FIG. 8 as well as in FIGS. 9A-9C such that the lateral movement L/L' is imparted to the datum tracks 64-70 in response to the rotational movement of the shear head 12 about the fixed pivot point 45. However, in an embodiment, it will be appreciated if a driving force is imparted to the datum tracks 64-70, that lateral movement or force in the direction of arrow L/L' of the datum tracks 64-70 may in turn, drive the rotational movement of the shear head 12. To provide such a movement, the datum tracks 64-70 may be interfaced with, for example, a hydraulic drive mechanism or the like that causes the link members 80-86 to rotatingly drive the shear head 12 when the datum tracks 64-70 are pushed/pulled by the hydraulic drive mechanism. Irrespective of the implementations described above, it will be appreciated that movement of one of the shear head 12 or datum tracks 64-70 is translated into movement of the other. Such an arrangement would eliminate the need for the worm gear 42/carriage 14 drive mechanism.

The rotational movement of the shear head 12 is shown in a clockwise direction in FIGS. 6-8 and 9A-9C. The rotational clockwise direction is in accordance with the rotational movement imparted to the worm drive gear 42 from the motor 40. However, it will be appreciated that rotational movement of the worm drive gear 42 in the opposite direction will result in counter-clockwise movement of the shear head 12, and, accordingly, a reversal in lateral movement L/L' of the datum track members 64-70.

Functionally, by permitting the first datum tracks 64, 68 and the second datum tracks 66, 70 to be simultaneously moved in opposite, lateral directions L, L' while also being linked to the shear head 12, a spacing, S, between ends 88, 90 and 92, 94 of the first and second datum tracks 64, 68 and 66, 70 is maintained such that a clearance is provided for a shear blade 96 (see, e.g., FIGS. 10-13) that extends from the shear head 12.

Without the lateral movement L, L' of the datum track members 64-70, it would be impossible to impart adequate spacing, S, unless the spacing, S, was set to accommodate the worst case condition (i.e. worse case condition is when $\theta$ is set to its maximum). However, default spacing may not be optimum for settings of $\theta$ that are less than $\theta_{MAX}$. As such, without the capability of laterally moving the datum tracks 64-70 to accommodate the angular position of the shear head, compromises would have to be made in setting, S, to accommodate worst case conditions. These worst case settings for S may compromise the accuracy of the cuts made by the shear when it is set at positions less than $\theta_{MAX}$.

Accordingly, it will be appreciated that the corresponding relationship as to the positioning of the shear head 12 and the ends 88-94 of the datum tracks 64-70 permit the datum tracks 64-70 to be automatically located with respect to the positioning of the shear head 12 without any manual intervention. Thus, by simply rotating the shear head 12, the ends 88-94 of the tracks 64-70 are maintained at an optimum spacing, S, from the shear blade 96.

Further, referring to FIGS. 10-13, the link members 84, 86 associated with the removing portion 62 are not only effective for maintaining the proper lateral position of each of the datum track 68, 70, but, also, the link members 84, 86 connected proximate the ends 92, 94 of the datum tracks 68, 70 also allow at least a substantially vertical movement of the datum tracks 68, 70 in the direction according to the arrow, Y.

The substantially vertical movement, Y, permits the datum tracks 68, 70 to be lowered when a moveable shear head portion 98 carrying the shear blade 96 moves downwardly in the direction of arrow, Y, to at least partially engage a fixed shear head portion 100. In operation, the vertical lowering of a portion of the removing portion 62 allows the removing portion 62 to be temporarily displaced (i.e. vertically lowered) away from the movable shear head portion 98 to ensure that there is no interference between the movable shear head portion 98 and the removing portion 62.

As illustrated in FIGS. 10-13, the substantially vertical movement of the removing portion 62 in the direction of the arrow, Y, may also be compounded with a rotational, pivoting movement according to the direction of the arrow, R (see, e.g., FIG. 12) about an axis extending through a point 101 of an end of the removing portion 62. When the shear blade 96 has finished its stroke, the removing portion 62 may be brought back to its original starting position of FIG. 10 by moving the removing portion 62 in the direction of arrows, Y', R', which is opposite the direction of arrows, Y, R.

Referring now to FIGS. 14-18, a cutting operation of the material blank, B, is described. First, the blank, B, is delivered to shear head 12 by way of the delivery portion 60. The blank, B, is shown to include a rectangular or square shape, however, the geometry of blank, B, is not critical and may be formed in any shape and from any desirable material. In an embodiment, the blank, B, may comprise any desirable metal. Further, in an embodiment, although a blank, B, having a square or rectangular shape is shown, it will be appreciated that the blank, B, may be in the form of a continuous sheet that is fed from a coil of material; as such, it will be appreciated that the blank, B, may be un-reeled from the coil and manipulated on the datum tracks 64, 66 toward the shear head 12.

Further, in an embodiment, the shear device 10 may include a plurality of datum wheels 102 to assist in the guiding of the blank, B, along the material guiding mechanism 75. The plurality of datum wheels 102 may be associated with the delivering portion 60 and removing portion 62. In an embodiment, the plurality of datum wheels 102 engage and align the blank, B, by engaging a first side, $B_{SIDE-1}$, of the blank, B, is moved laterally in the direction of the arrow, L' delivering portion 60 and removing portion 62. As illustrated, the first side, $B_{SIDE-1}$, of the blank, B, is generally parallel to a second side, $B_{SIDE-2}$, of the blank, B.

Figure 14:
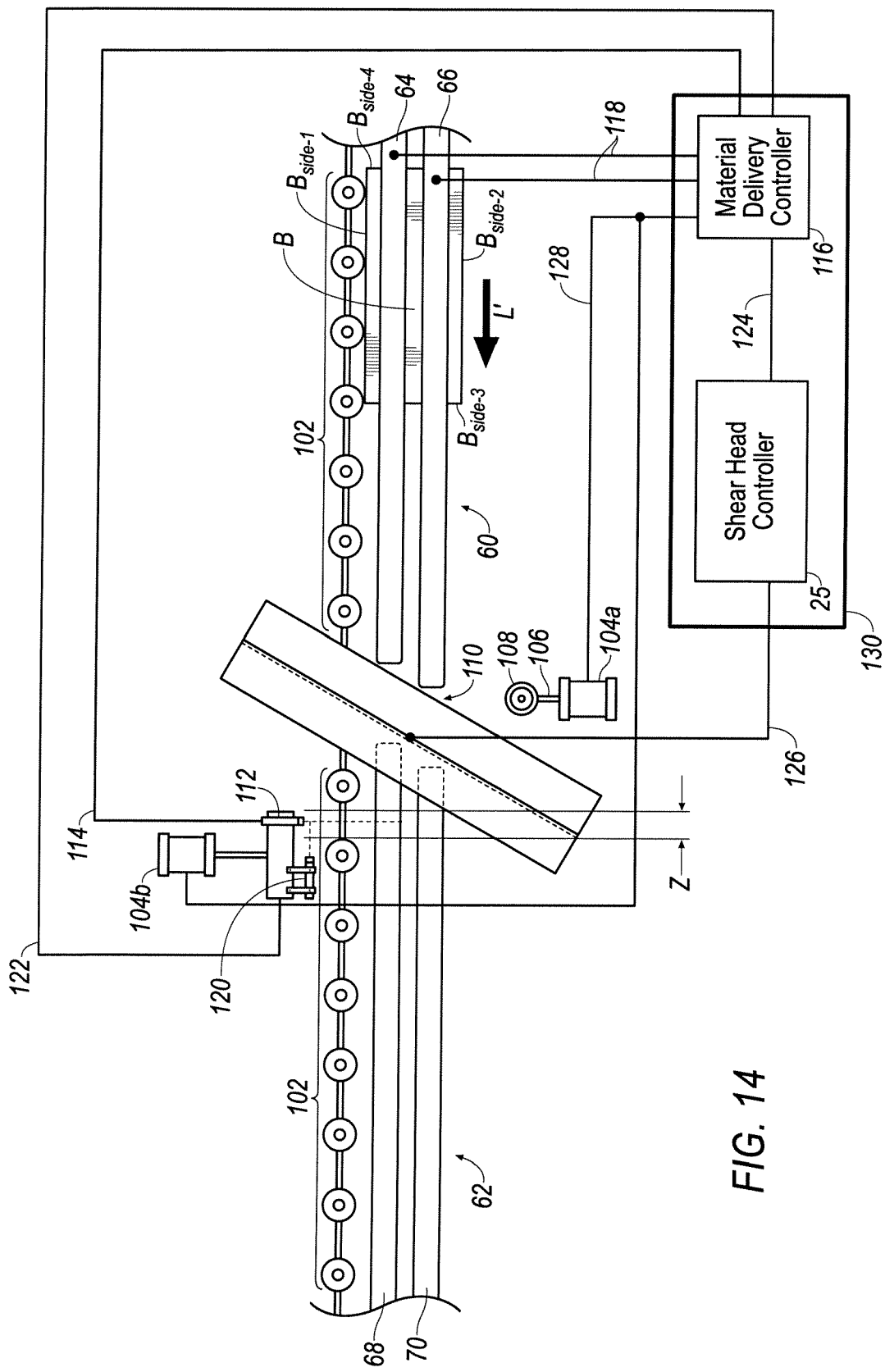
FIG. 14 is a partial top view of the shear device of FIG. 1 and a blank of material trained to a first position according to an embodiment.
Figure 15:
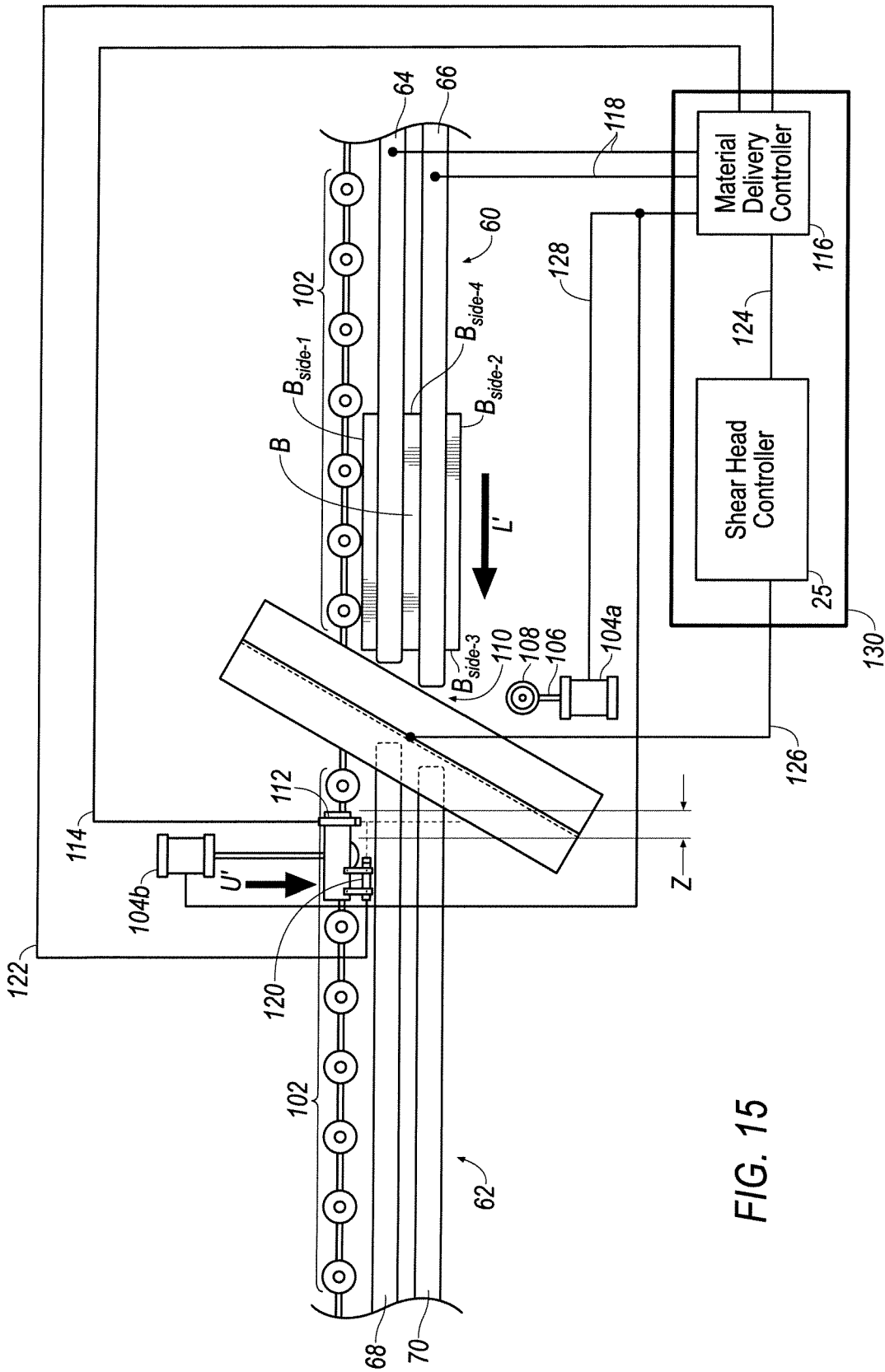
FIG. 15 is a partial top view of the shear device of FIG. 14 and the blank of material trained to another position according to an embodiment.
Figure 16:
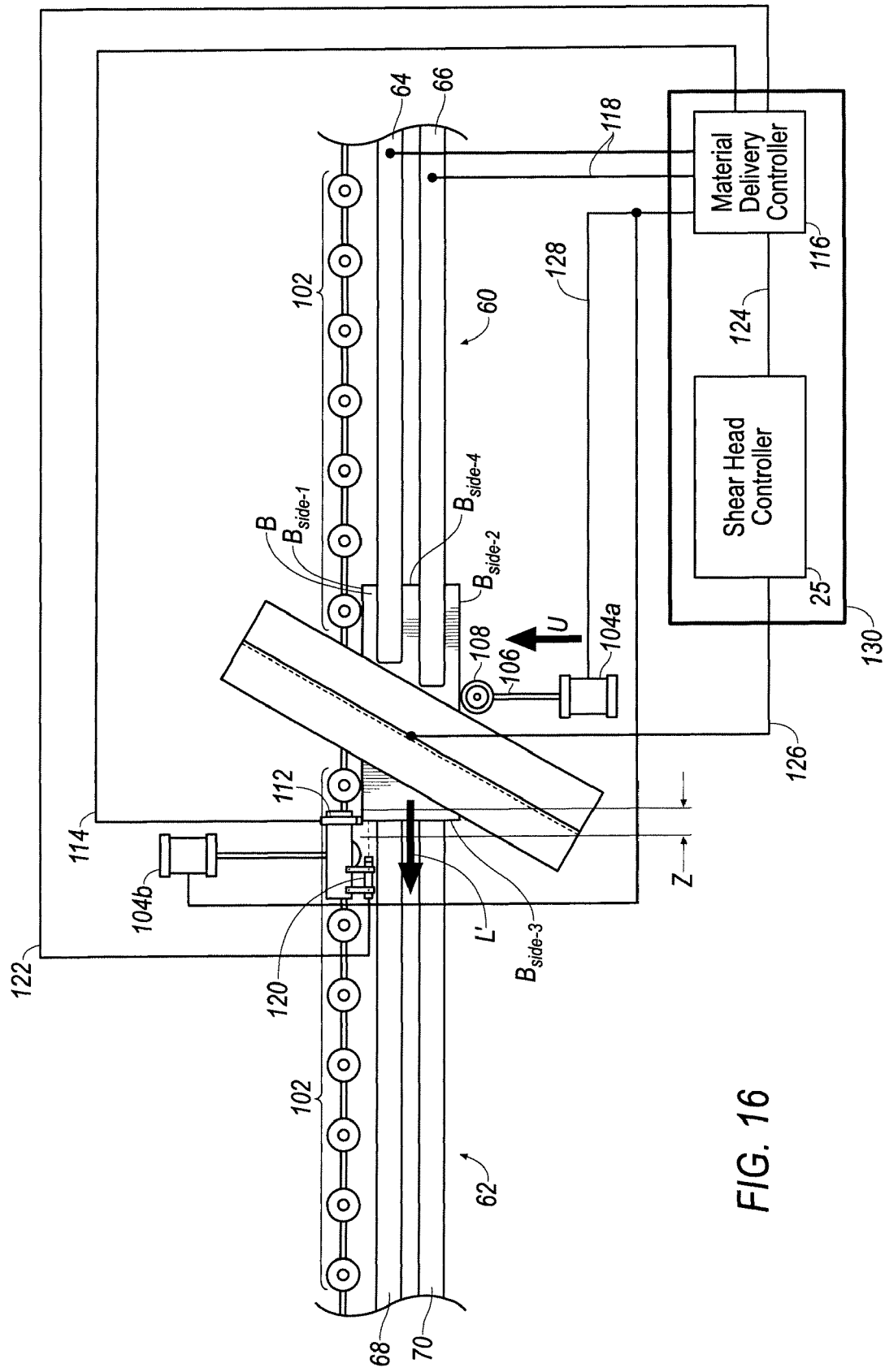
FIG. 16 is a partial top view of the shear device of FIG. 15 and the blank of material trained to another position according to an embodiment.

As seen in FIGS. 14 and 15, the blank, B, is moved toward the shear head 12 in the direction of arrow, L'. In FIG. 16, once the blank, B, is positioned proximate the shear head 12, a push mechanism 104a including a longitudinally extending arm 106 is activated to thereby urge a roller wheel 108 extending from the arm 106 in the direction of arrow, U, to engage the second side, $B_{SIDE-2}$, of the blank, B. The direction of arrow, U, is substantially perpendicular to the direction of arrows, L, L'.

The urging of push mechanism 104a against the second side, $B_{SIDE-2}$, of the blank, B, ensures that the first side, $B_{SIDE-1}$, of the blank, B, is properly and fully pressed against and aligned with two or more of the plurality of datum wheels 102. It will be appreciated that the push mechanism 104a can be comprised of any desirable components/devices including, for example, a pneumatic, electric, hydraulic, or any other mechanism capable of generating a force in the direction of arrow, U.

Referring to FIGS. 14-16, blank, B, is manipulated by the tracks 64-70 at a first rate of speed toward a working opening 110, a sensing mechanism 104b is moved from a retracted position (see, e.g., FIG. 14) and into a sensing position (see, e.g., FIGS. 15 and 16) according to the direction of the arrow, U', which is opposite the direction of the arrow, U. Once moved into the sensing position, the sensing mechanism 104b establishes a sensing zone, Z.

The range of the sensing zone, Z, is determined by the sensitivity of a first sensor 112 of the sensing mechanism 104b.

Once a leading edge, $B_{SIDE-3}$, of the blank, B, penetrates a portion of the sensing zone, Z, the first sensor 112 senses the leading edge, $B_{SIDE-3}$, of the blank, B, and sends a control signal 114' along path 114 to a material delivery controller 116. As illustrated, in an embodiment, the leading edge, $B_{SIDE-3}$, of the blank, B, is substantially perpendicular to the first and second sides, $B_{SIDE-1}$, $B_{SIDE-2}$, of the blank, B; however, it will be appreciated that the leading edge, $B_{SIDE-3}$, of the blank, B, may be defined to be non-perpendicular with respect to the first and second sides, $B_{SIDE-1}$, $B_{SIDE-2}$, of the blank, B.

As illustrated, the blank, B, also includes a trailing edge, $B_{SIDE-4}$, that is opposite the leading edge, $B_{SIDE-3}$, and substantially perpendicular to the first and second sides, $B_{SIDE-1}$, $B_{SIDE-2}$. As described above, it will be appreciated that the trailing edge, $B_{SIDE-4}$, of the blank, B, may be defined to be non-perpendicular with respect to the first and second sides, $B_{SIDE-1}$, $B_{SIDE-2}$, of the blank, B.

The presence of control signal 114' indicates to the material delivery controller 116 that a leading edge of blank, B, has entered zone Z at the first rate of speed $V_1$, such that the blank, B, is manipulated along the datum tracks 64, 66 at a second rate of speed $V_2$ that is slower than the first rate of speed $V_1$. Thus, upon receipt of the control signal 114' at the controller 116, the controller 116 will then communicate a delivery speed signal 118 to each datum track 64, 66 to regulate the rate of speed at which the blank, B, is delivered to the shear head 12.

Functionally, the second, slower rate of speed $V_2$, allows the blank, B, to "creep" to a desired positioning proximate the shear head 12. By utilizing a two-stage speed delivery system, the blank, B, can be very quickly brought to the working area 110, but, thereafter, the blank, B, can be incrementally positioned to a final, accurate position using the slower, "creep speed." By using a creep speed for the final, refined positioning, high repeatability can be accomplished in the placement of blanks, B, relative the blade 96, and, as a result, a repeatable shear angle, Ψ (see, e.g., FIG. 18), of each blank, B, may be generated with very little dimensional variance between blanks.

Figure 17:
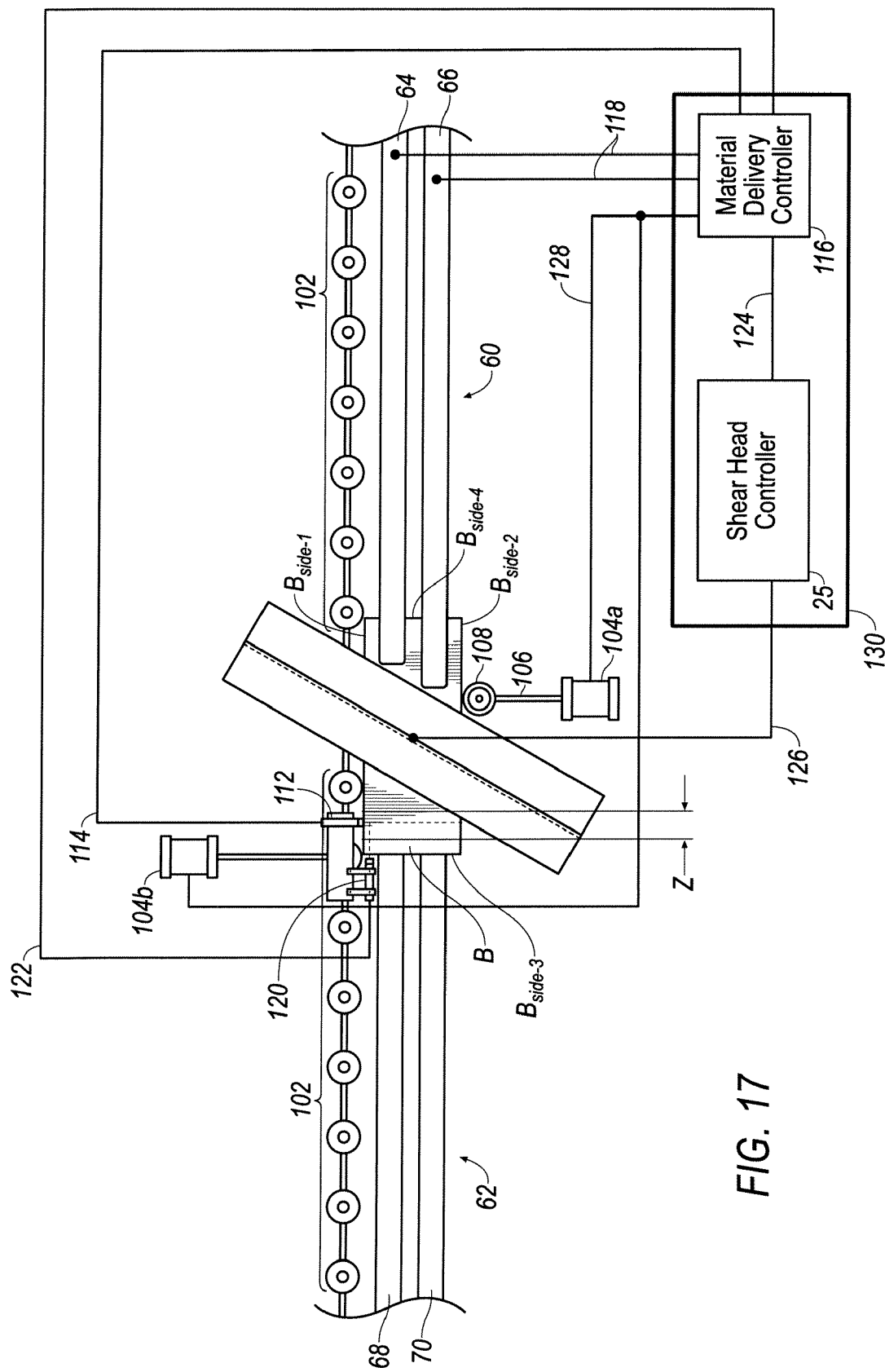
FIG. 17 is a partial top view of the shear device of FIG. 16 and the blank of material trained to another position according to an embodiment.

Still referring to FIG. 16, once the blank, B, has moved into the sensing zone, Z, of the first sensor 112, a second sensor 120 of the sensing mechanism 104b, which may be arranged substantially perpendicularly to the sensing zone, Z, is then activated to sense the slow advancement of the leading edge, $B_{SIDE-3}$, of the blank, B, as the leading edge, $B_{SIDE-3}$, of the blank, B, is advanced toward the second sensor 120. As seen in FIG. 17, when the leading edge, $B_{SIDE-3}$, of the blank, B, is manipulated into the appropriate location, the second sensor 120 sends a second control signal 122 along communication path 122 to the material delivery controller 116. thereafter, the controller 116 ceases further movement of the datum tracks 64, 66 preventing further lateral movement of the blank, B.

In an embodiment, the first sensor 112 and the second sensor 120 may include any desirable type of proximity sensor. Such proximity sensors may include inductive proximity sensors, ultrasonic proximity sensors, capacitive proximity sensors, light detection proximity sensors and the like. Additionally the function of sensors 112 and 120 may be combined into a single sensor if one can be manufactured with the necessary range and sensitivity.

Once the blank, B, is resting at the appropriate location within the working opening 110, the material delivery controller 116 may send a signal 124 along communication path 124 to the shear head controller 25. The signal 124 actuates the shear hear 12 as shown and described in FIGS. 10-13 so as to shear the blank, B forming $B_{W1}$ and $B_{W2}$. Alternatively, if not conducted prior to the delivery of the blank, B, at the working opening 110, the signal 124 may first cause the shear head 12 to be pivoted about the pivot point 45 to the desired angle, $\theta_{MIN}$-$\theta_{MAX}$, as shown in FIGS. 2-9C, and, upon being pivoted to the desired angle, $\theta_{MIN}$-$\theta_{MAX}$, a further signal 124 may be provided to actuate the shear device 10 as described in FIGS. 10-13.

It will be appreciated that the activation of push mechanism 104a and sensing mechanism 104b may be controlled by one or more control signals 128 originating from the material delivery controller 116. Further, it will be appreciated that the functionality associated with the two separate controllers 25, 116 may be combined into and provided by a single controller, which is shown generally at 130.

Figure 18:
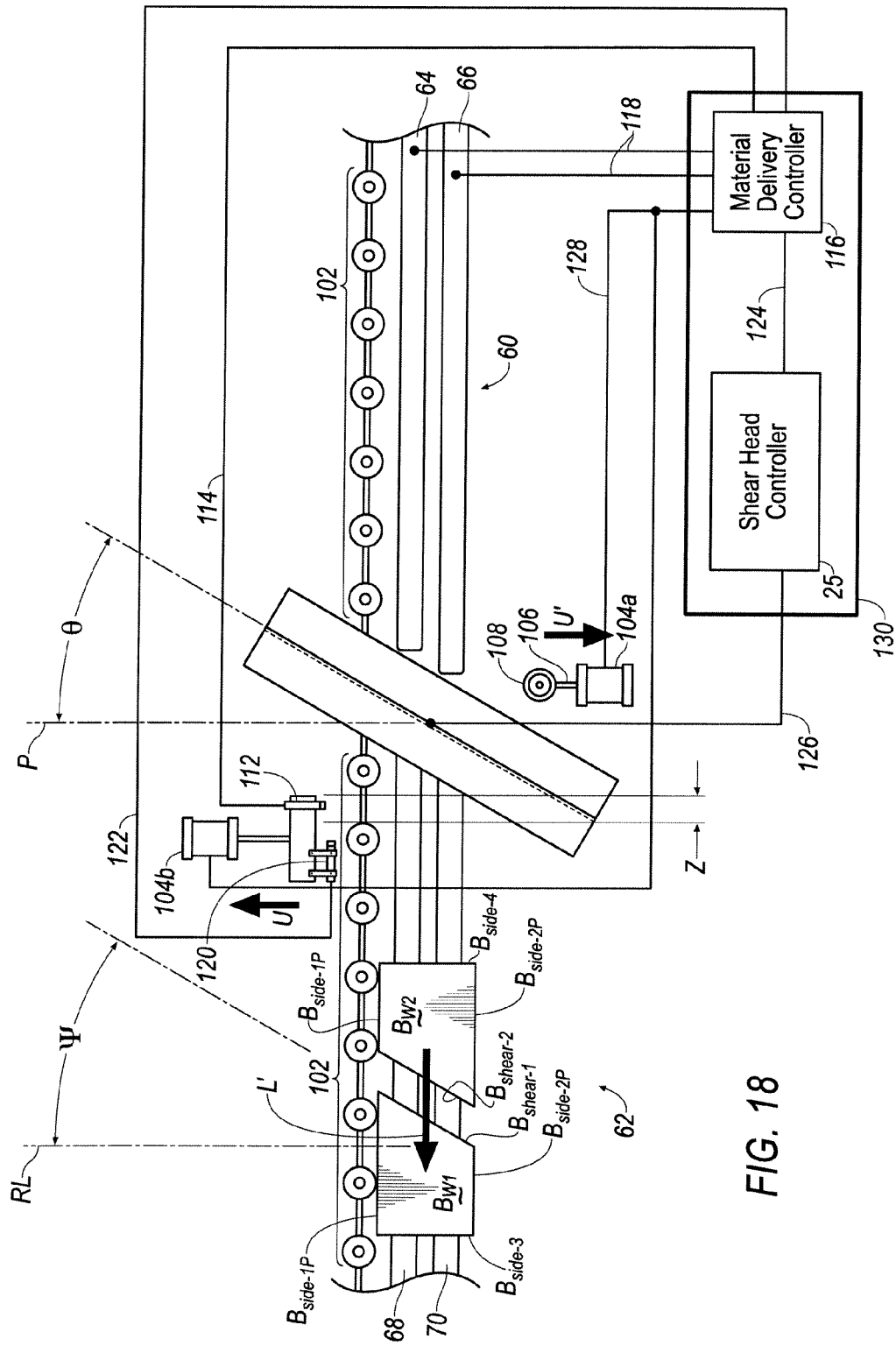
FIG. 18 is a partial top view of the shear device of FIG. 16 and the blank of material shear to define at least first and second work pieces that are trained to another position according to an embodiment.

Referring now to FIG. 18, at the appropriate time (e.g. after completion of the shear operation), the push mechanism 104a may be retracted away from the datum tracks 64, 66 generally in the direction of arrow, U'. Likewise, at the appropriate time (e.g. after completion of the shear operation), the sensing mechanism 104b may be retracted away the datum tracks 68, 70 in the direction of arrow, U.

Further, as seen in FIG. 18, once the blank, B, has been sheared by the blade 96 of the shearing head 12, the blank, B, is advanced by the datum tracks 68, 70 of the removing portion 62 in the direction of the arrow, L'.

As illustrated, the sheared blank provides a first work piece, $B_{W1}$, and a second work piece, $B_{W2}$. Although two work pieces, $B_{W1}$, $B_{W2}$, are shown, it will be appreciated that the blank, B, may be sheared into any desirable number of work pieces greater than two. Further, it will be appreciated that upon shearing the blank, B, the work pieces, $B_{W1}$, $B_{W2}$, may include substantially equal or different lengths defined by portions of the first and second sides , $B_{SIDE-1P}$, $B_{SIDE-2P}$.

Further, each work piece, $B_{W1}$, $B_{W2}$, may be sheared into any desirable shape including, for example, a triangle, a parallelogram, a trapezoid, or the like. To form some of the above shapes, such as, for example, a triangle or trapezoid, it will be appreciated that the shear device 10 may be manipulated in several steps. First, the blank, B, is advanced proximate the shear head 12. Then, the shear head 12, which is located in a first angular positioning, $\theta$, is actuated to shear the blank, B, in first in a first stroke of the blade 96. Then, the datum tracks 64-70 are actuated to further train the blank, B, relative the shear head 12. Then, the shear head is oriented to a second angular positioning, $\theta$, different than that of the first angular positioning, $\theta$. Then, the shear head 12 is actuated a second time to shear the blank, B, in a second stroke of the blade 96. If, for example, a parallelogram shape of the blank, B, is desired, the step of orientating the shear head 12 to a second angular positioning, $\theta$, is eliminated.

As illustrated in FIG. 18, in an embodiment, the blank, B, is shown divided into two work pieces, $B_{W1}$, $B_{W2}$, each defining a trapezoid (i.e. a type of quadrilateral wherein two opposing sides are parallel). The first work piece, $B_{W1}$, includes the leading edge, $B_{SIDE-3}$, a portion of the first and second sides, $B_{SIDE-1P}$, $B_{SIDE-2P}$, and a trailing shear edge, $B_{SHEAR-1}$. The second work piece, $B_{W2}$, includes a leading shear edge, $B_{SHEAR-2}$, the trailing edge, $B_{SIDE-4}$, a portion of the first and second sides, $B_{SIDE-1P}$, $B_{SIDE-2P}$.

As illustrated, each shear edge, $B_{SHEAR-1}$, $B_{SHEAR-2}$, is referenced from a line, RL, that is substantially perpendicular to the parallel portions defining the first and second sides, $B_{SIDE-1P}$, $B_{SIDE-2P}$, of the blank, B. Further, each shear edge, $B_{SHEAR-1}$, $B_{SHEAR-2}$, is defined by a shear angle, $\Psi$, that is substantially equal to the angular position, $\theta$, of the blade 96 of the shear head 12.

Movement of the first and second work pieces, $B_{W1}$, $B_{W2}$, provided by the removing portion 62 in the direction according to the arrow, L', is substantially similar as described above with respect to the delivering portion 60. Although not shown in FIGS. 14-18, the datum tracks 68, 70 of the removing portion 62 may be controlled by signals 118' carried over signal path 118. Signals 118' may be issued from the material delivery controller 116 such that the rate of speed of the datum tracks 68, 70 of the removing portion 62 is substantially similar to that of the datum tracks 64, 66 of the delivering portion 60. By providing substantially similar rates of speed for each of the datum tracks 64, 66 and 68, 70, successive blanks, B, and work pieces, $B_{W1}$, $B_{W2}$, may be delivered and removed at similar rates of speed to provide an efficient shearing operation without encountering delays.

Figure 19A:
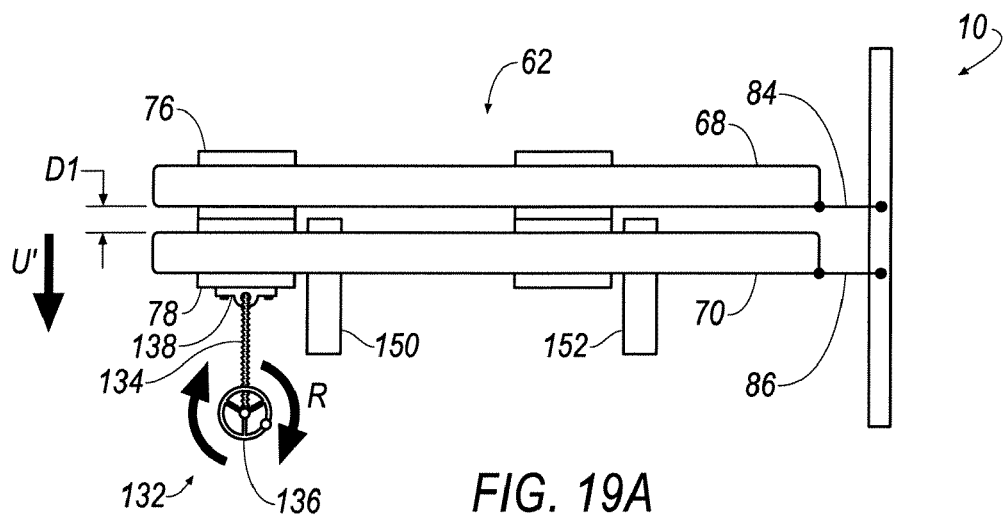
FIGS. 19A-19C illustrate top views of the pair of datum tracks coupled to the shear head of the shear device of FIG. 1 each having a unique parallel spacing according to an embodiment.
Figure 19B:
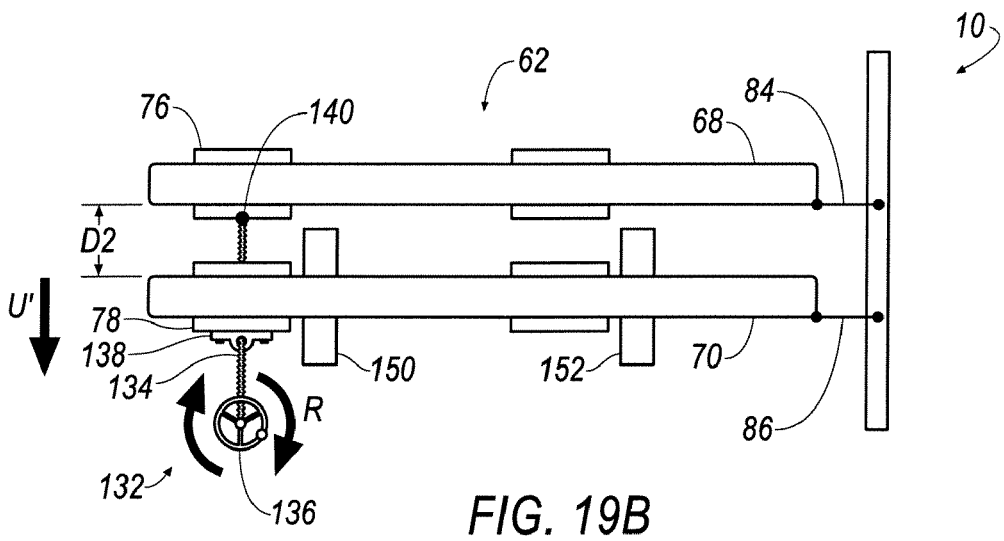
Figure 19C:
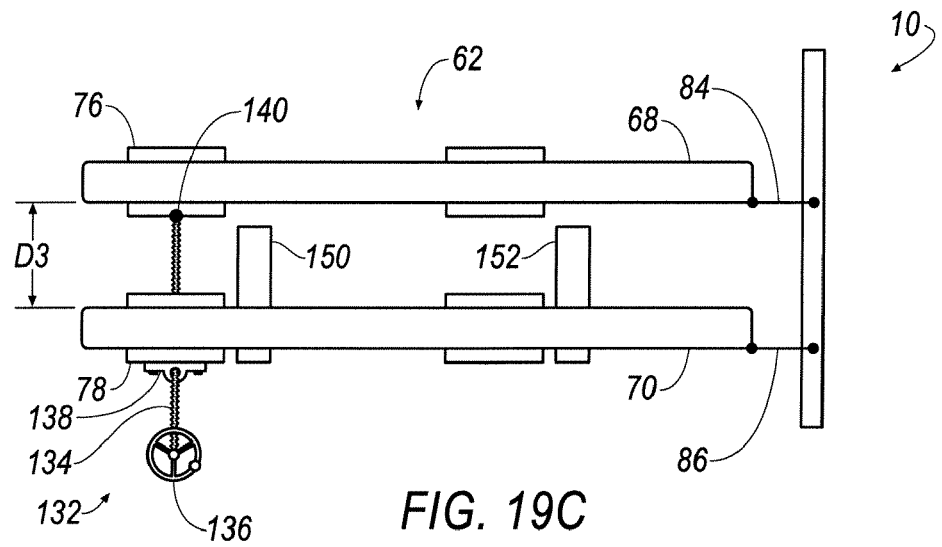

Referring now to FIGS. 19A-19C, the removing portion 62 is shown in an embodiment. Although the foregoing description is associated with the removing portion 62, a similar operation may be provided for the delivering portion 60.

As illustrated, the first and second datum tracks 68, 70 are supported on their respective guides 76, 78. Because it is anticipated that blanks, B, and work pieces, $B_{W1}$, $B_{W2}$, may have different widths (e.g., referenced by the lengths of the leading and trailing edges, $B_{SIDE-3}$, $B_{SIDE-4}$), the support guides 76, 78 (and the corresponding position of the datum tracks 68, 70) may be adjusted such that the datum tracks 68, 70 may be spaced, in parallel, at progressively greater distances, $D_1$-$D_3$.

In an embodiment, a datum track spacing mechanism is shown generally at 132. In an embodiment the datum track spacing mechanism 132 may include a worm gear 134 and a hand crank 136 that extends through the guides 76, 78.

In an embodiment, the worm gear 134 can interface to the guide 78 by way of a threaded pillow block 138. In an embodiment, the worm gear 134 can interface to the guide 76 by way of ball and socket joint 140 (FIGS. 19B, 19C).

Functionally, the threaded pillow block 138 translates rotational movement according to the direction of arrow, R, of the worm gear 134 into movement of the guide 78 of the second datum track 70 relative a fixed position of the guide 76 of the first datum track 68 in the direction of the arrow, U'. It will be appreciated that rotational movement in a direction opposite the arrow, R, results in movement of the track 70 and guide 78 in a direction opposite the arrow, U'. Thus, the datum track spacing mechanism 132 provides for an increase or decrease in the parallel spacing, $D_1$-$D_3$, to accommodates different widths of material blanks, B, and work pieces, $B_{W1}$, $B_{W2}$. Pad supports 150, 152 bear the vertical load of datum track 70 and datum track spacing mechanism 132 while permitting unrestricted horizontal movement U' of datum track 70.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A shear device, comprising: a material guiding mechanism; a shear head including a shear blade disposed proximate the material guiding mechanism; means for translating a first movement of one of the shear head, and the material guiding mechanism into a second movement of the other of the shear head, and the material guiding mechanism, wherein the material guiding mechanism includes a material delivering portion, and a material removing portion, wherein each of the material delivering portion and the material removing portion includes a first conveyor track, and a second conveyor track, wherein the means for translating includes a first link member that connects the first conveyor track of the material delivering portion to the shear head; a second link member that connects the second conveyor track of the material delivering portion to the shear head; a third link member that connects the first conveyor track of the material removing portion to the shear head; and a fourth link member that connects the second conveyor track of the material removing portion to the shear head, wherein the first movement is a rotational movement of the shear head, and wherein the second movement includes lateral displacement of the first conveyor tracks in a first direction and lateral displacement of the second conveyor tracks in a second direction opposite the first direction wherein the first and second conveyor tracks of each of the material delivering portion and the material removing portion are parallel to one another, wherein the shear device includes means for adjusting a parallel spacing of the first and second conveyor tracks of each of the material delivering portion and the material removing portion.

2. The shear device according to claim 1, further comprising:

a track;

a carriage supported by and rotationally movable relative the track, wherein the carriage supports the shear head.

3. The shear device according to claim 2, further comprising:

a motor; and a worm gear coupled to the motor, wherein the worm gear is interfaced with a geared, outer arcuate surface of the carriage.

4. A method for operating a shear device, comprising the steps of:

providing the shear device as set forth in claim 1;

rotating the shear head; and translating the rotational movement of the shear head into lateral displacement of the first conveyor tracks in a first direction, and lateral displacement of the second conveyor tracks in a second direction opposite the first direction.

5. The method according to claim 4, further comprising the step of:

connecting each of the conveyor tracks to the shear head with a link member.

6. The method according to claim 4, further comprising the steps of:

providing a track;

supporting a carriage on the track, wherein the carriage is rotationally movable relative the track; and supporting the shear head on the carriage.

\* \* \* \* \*